United States Patent Office 3,245,929
Patented Apr. 12, 1966

3,245,929
METHOD OF COMPOUNDING CIS-POLYBUTADIENE FOR IMPROVED MILL HANDLING AND PRODUCT THEREOF
Henry E. Railsback and Nelson A. Stumpe, Jr., Bartlesville, Okla., assignors to Phillips Petroleum Company, a corporation of Delaware
No Drawing. Filed Feb. 16, 1959, Ser. No. 793,279
9 Claims. (Cl. 260—23.7)

This invention relates to a method of compounding cis-polybutadiene. In one of its aspects this invention relates to a readily millable rubbery composition containing polybutadiene having a high cis 1,4- content.

Historically, natural rubber has been known to possess several advantages over competing types of synthetic rubber for use in tire stock. Characteristics of natural rubber which are superior in tire applications are low hysteresis, or low heat build-up under flexing, and high tack so that plies of rubber will adhere without the use of adhesives. Recently a synthetic rubber has been developed which in many respects is superior to natural rubber and shows considerable improvement in the properties of heat build-up and tack over the conventional GR–S stocks which are now predominantly used in the industry. This synthetic rubber which offers great promise in the automobile and truck tire field is a linear polymer of 1,3-butadiene, having greater than 75 percent of cis-1,4 configuration. This product shows relatively low heat build-up on flexing and excellent blowout time.

The importance of a synthetic polymer as a substitute for natural rubber is well recognized in the United States and other countries where supplies of imported natural rubber are subject to being terminated. Substantial existing capacity for production of 1,3-butadiene makes obvious the advantages of this polymer over synthetics based upon the isoprene monomer.

A problem in the commercial development of this superior product is the behavior of cis-polybutadiene on a mill roll. When attempting to mill cis-polybutadiene stocks compounded according to conventional recipes, the rubber tends to "bag" and separate from the mill roll and thorough mixing is difficult. Processing problems of this nature do not exist with conventional butadienestyrene stocks of similar Mooney value. It has been noted that the cis-polybutadiene stocks do not exhibit shrinkage on the mill as is characteristic of GR–S stocks and this undoubtedly contributes to the mill handling difficulties encountered with the cis-polybutadiene.

We have discovered that the mill handling characteristics of cis-polybutadiene can be substantially improved by changing the compounding recipe from that normally employed for comparable types of synthetic rubber. We have discovered that compounded stocks of cis-polybutadiene which contain fatty acid in an amount of 0.8 part by weight or less per 100 parts of rubber (polybutadiene) exhibit good mill handling characteristics. The mixing which can thereafter be effected on a roll mill is sufficiently thorough as to permit further commercial development of this rubber. A higher improvement in mill handling is evidenced when the fatty acid is left out of the compounding recipe altogether and it is preferred that the fatty acid content not exceed 0.5 phr. We have further found that mill handling characteristics can be improved in such stocks which contain the above-described low fatty acid content by plasticizing with at least 5 phr. pine tar plasticizer. Improved mill handling as well as improvements in other phyiscal characteristics such as extrudability and low heat build-up are observed when a mixed plasticizer is employed, using at least 5 phr. pine tar with from 5 to 45 phr. oil plasticizer such as a highly aromatic oil or a liquid polymer of a conjugated diene. The improvements which are thus obtainable by such formulation are made with cis-polybutadiene stocks containing about 60 to 200 parts by weight of carbon black per 100 parts of polymer. This synthetic rubber when compounded according to our invention and blended on a roll mill exhibits improved processability both on the mill and in the extruder and provides a highly suitable tread stock having improved heat build-up, blowout time and abrasion resistance over conventional GR–S.

It is an object of our invention to provide a method of compounding cis-polybutadiene to yield a stock that can be readily handled on a roll mill with good mixing plus providing a good balance of physical properties in the finished product. Another object of our invention is to improve the mill handling characteristics of polybutadiene compounded stocks where the polybutadiene contains a high percent of cis 1,4-configuration. Another object is to provide an improved rubber stock of cis-polybutadiene which can be readily milled in its uncured state. Other objects, advantages and features of our invention will be apparent to those skilled in the art from the following discussion.

The polybutadiene to which my invention applies is a linear polymer of 1,3-butadiene containing at least 75 percent cis-1,4 configuration and preferably at least 85 percent cis-1,4-configuration. Generally when the polymer is produced as described below the cis-1,4 content is about 90 to 100 percent. Such a polymer can be produced by polymerizing 1,3-butadiene in the presence of a catalyst composition comprising a trialkylaluminum and titanium tetraiodide. Preparation of this polymer is more fully described in the copending application of David R. Smith et al., Serial No. 578,166, filed April 16, 1956.

The trialkylaluminum employed in this catalyst system with titanium tetraiodide can be represented by the formula $R_3Al$, wherein R is an alkyl radical containing 1 to 6 carbon atoms. The alkyl groups can be either straight or branched chain alkyls and they can be the same or different. For example, suitable alkyls are ethyl, propyl, isopropyl, n-butyl, isobutyl, pentyl, n-hexyl or isohexyl and the like. Mixed alkyl groups, such as in diisobutylmonethylaluminum, are also suitable. Triethylaluminum and triisobutylaluminum are preferred since these compounds have a high activity in the polymerization process.

The amount of trialkylaluminum used in this preferred catalyst composition is usually in the range of 1.25 to 35 mols per mol of titanium tetraiodide. A preferred ratio, however, is from about 1.5 to 10 mols of trialkylaluminum per mol of titanium tetraiodide. Increased yields of the polybutadiene product are obtained when using catalyst compositions falling within these preferred ratios.

The temperature at which the polymerization process is carried out should not exceed 150° C. in order to maintain the degree of gel formation as low as possible. The temperature is generally within the range of −100° C. to 100° C., but it is preferred to operate in the range of about −20° C. to 50° C.

The polymerization is preferably carried out in the presence of an inert, hydrocarbon diluent although the use of such a diluent is not absolutely necessary. The pressure is generally that sufficient to maintain monomeric material substantially in the liquid phase although higher pressures can be employed, if desired, such as by pressuring with an inert gas. The catalyst concentration can vary over a wide range and is usually in the range of about 0.01 to 15 weight percent or higher, based on the monomeric material charged to the reactor. The preferred catalyst concentration is in the range of 0.05 to 10 weight percent and more preferably between 0.05 and 5 weight percent based on the 1,3-butadiene charged to the reactor. At the lower mol ratios of trialkylaluminum to titanium tetraiodide, it is frequently desirable to operate above the minimum level of catalyst concentration.

Suitable diluents for use in the polymerization process are paraffins, cycloparaffins and/or aromatic hydrocarbons which are relatively inert, non-deleterious and liquid under the reaction conditions of the process. The lower molecular weight paraffins, such as propane, butane, and pentane are especially useful when the process is carried out at low temperatures. However, the higher molecular weight paraffins and cycloparaffins such as isooctane, cyclohexane, methylcyclohexane and aromatic diluents such as benzene, toluene and the like, as well as mixtures of these diluents can also be used. Reactor residence time can vary widely, from 1 second to 1 hour for continuous reactions to as long as 24 or more hours for batch processes.

Various materials are known to be destructive to the catalyst composition of this invention. These materials include carbon dioxide, oxygen and water. It is highly desirable, therefore, that the 1,3-butadiene be freed of these materials, as well as other materials which tend to inactivate the catalyst. Any of the known means for removing such contaminants can be used. Also, when a diluent is employed in the process, it is preferred that this material be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. Thus, it has been found that satisfactory polymerization rates can be obtained when as much as 500 to 1000 parts of water per 1,000,000 parts of reactor charge are present in the reactor. It is to be understood, however, that the amount of water which may be tolerated in the reaction mixture is insufficient to completely deactivate the catalyst.

At completion of the polymerization reaction, the reaction mixture is treated to inactivate the catalyst and precipitate the rubber polymer, as by adding an alcohol. The polymer is then separated from the alcohol and diluent by any suitable means such as decantation or filtration. The polymer thus produced is a rubbery polymer which is elastomeric and vulcanizable and after vulcanization, i.e., cross-linking, possesses the properties normally associated with vulcanized rubber, including materials which when compounded and cured exhibit reversible extensibility at 80° F. of over 100 percent of the specimen's original length with a retraction of at least 90 percent within one minute after release of the stress necessary to elongate to 100 percent.

The cis-polybutadiene stocks are compounded with conventional equipment used by the industry. Preferably, the additives are incorporated into the polymer in a Banbury and the compounded stocks then mixed on the roll mill; however, part or all of the additives can be incorporated on the roll mill. Cis-polybutadiene having a Mooney value greater than 25 (ML-4 at 212° F.) is preferably compounded with a high amount of carbon black, at least about 60 parts by weight up to 200 parts by weight of carbon black per 100 parts of rubber. Generally, the polymer with which our invention is concerned has a Mooney value of about 35 to 45 and the amount of carbon black does not exceed 100 parts and, more preferably, especially where the rubber is to be used for tread stock, the amount of black does not exceed about 75 parts per 100 parts of rubber. Plasticizers are employed in amounts ranging from 5 to 130 parts by weight although normally the amount of plasticizer does not exceed 50 parts by weight unless unusually high quantities of black, i.e., above 100 parts, are used. The amount of black and plasticizer is regulated to provide good extrudability of the finished stock and although these additives in the proper balance will improve mill handling to a degree, further improvement in mill handling is obtained when a pine tar plasticizer is used, preferably in an amount of at least 5 parts per 100 parts of rubber.

Pine tar plasticizers which we intend to include within the scope of our invention are pine tar and pine tar oil. These are naturally occurring pine tar resins and contain partially cracked terpenes and resin oils. Pine tar is available in light, medium and heavy grades, any one of which is suitable for use in our invention.

In a preferred aspect of our invention, pine tar is mixed or used in conjunction with other plasticizers, preferably of the liquid type. In general, however, any of the plasticizers which are employed in rubber compounding are applicable so long as they are compatible with the rubber. Various liquid polymers such as liquid polybutadiene, liquid polymers of 1,3-pentadiene, liquid polyisoprene, liquid polychloroprene, liquid butadiene/styrene copolymers, and other liquid homopolymers and copolymers are suitable as well as hydroxylated derivatives of these polymers and esters thereof. Solid plasticizers such as mineral rubber, coumarone-indene resins, condensation products of alkylated phenols with acetylene, e.g., tert-butylphenol and acetylene, and the like, can be used. Various hydrocarbon oils can also be used such as those which are obtained from catalytic cracking and dehydrogenation operations, extract oils from solvent extraction of lubricating oil stocks with furfural, phenol, etc., oils from alkylation reactions, polymers from clay tower treating of cracked gasolines, resins, coal tar products, and vegetable oils. Aromatic oils are often preferred.

Various types of reinforcing carbon blacks, alone or in admixture with each other, can be utilized in preparing the compositions herein described. Examples of these blacks which are known in the trade include easy-processing channel (EPC), medium-processing channel (MCP), hard-processing channel (HPC), semi-reinforcing furnace (SRF), medium-abrasion furnace (MAF), reinforcing furnace (RF), high abrasion furnace (HAF), medium thermal (MF), fine thermal (FT), super-abrasion furnace (SAF), and intermediate super-abrasion furnace (ISAF), black.

When preparing the cis-polybutadiene compositions herein described, any of several methods can be used. A masterbatch of the rubber and plasticizer can be prepared by Banbury mixing or other means and the black added to give a masterbatch of cis-polybutadiene, black, and plasticizer. All ingredients except curatives can be added to the rubber along with the black and plasticizer, and the curatives can be incorporated last on a roll mill or in a Banbury mixer. The black and plasticizer can be added directly to the cis-polybutadiene solvent mixture prior to coagulation or polymer recovery, if desired. Numerous other variations in the method of preparing the compositions may be introduced.

It is conventional when compounding synthetic rubber of this type to employ at least 1 and generally 2 phr. of stearic acid as a cure accelerator. With cis-polybutadiene containing at least 75 percent, and preferably at least 90 percent, cis-1,4- configuration, the degree of cure within a given period does not appear to be materially affected by reducing the amount of stearic acid to not over 0.8 phr. but the mill handling characteristics are substantially improved. We have found that good results can be obtained when the weight ratio of pine tar to stearic acid is 10:1 or greater. Because the addition of pine tar appears to have some measurable adverse effect upon hysteresis or heat build-up in the finished stock, it is desirable that the amount of pine tar be held relatively low where the finished stock is intended for use in tire treads. A preferred blend of plasticizer is a mixture of 5 to 15 parts of pine tar with 5 to 15 parts of highly aromatic oil plasticizer in 100 parts by weight of the cis-polybutadiene.

Evaluation of mill handling characteristics for a compounded rubber stock is a subjective matter which requires the eye and judgment of one skilled in the art. To provide thorough and efficient mill mixing, a rubber stock should adhere to the roll in a tight coherent mass. Good milling is indicated by a smooth and glossy continuous band on roll rather than a band which contains holes and is dry and rough. Good milling can also be observed at the nip between the rolls where the excess stock should roll rather than fold over in the nip. A stock which has poor mill handling character will bag and pull away from the roll and may even fall off. Finally, when the stock is sheeted off the mill, the band is cut across the roll width and a smooth continuous sheet with smooth edges should be removed. A rough sheet containing holes and ragged edges is extremely difficult to handle and may be unusable on a commercial scale where large quantities of stock are handled. Ratings given in the examples which follow are based upon the above criteria and are given as "good," "fair+," "fair," "fair−" or "poor." "Good" compares favorably with the milling behavior expected from GR–S stocks which are noted for their ease of mill handling. "Fair+," "fair" and "fair−" are all acceptable ratings while "poor" is unacceptable.

*Example I*

Cis-polybutadiene was prepared in an 80-gallon, stainless steel reactor equipped with an agitator operating at 130 r.p.m. Refrigerated methanol was circulated through the reactor jacket for temperature control. The polymerization recipe was as follows:

| | Parts by weight |
|---|---|
| Butadiene | 100 |
| Toluene | 1200 |
| Triisobutylaluminum (TIBA) | Variable |
| Titanium tetraiodide (TiI$_4$) | Variable |
| Antioxidant: Phenyl-beta-naphthylamine | 2.0 |
| Polymerization temperature, ° F. | 20 |

Charge order: Solvent, butadiene, cool to 4–6° F., TIBA, TiI$_4$.

Triisobutylaluminum was charged as a 25 percent solution in toluene. Titanium tetraiodide was charged as a 1.0 percent dispersion in toluene.

Five runs were made and all were shortstopped with water in the blowdown tank. Phenyl-beta-naphthylamine was added as a 2.0 percent solution in toluene. The polymer-solvent mixture was then given a 10 phr. (parts by weight per 100 parts of rubber) sulfuric acid wash at 170° F. followed by two water washes at room temperature. A volume of water equal to the polymer-solvent volume was used for all three washes. Polymerization data are shown in the following table:

| Run | TIBA, parts | TiI$_4$, parts | Time, hours | Conversion, percent | Pounds polymer in blend |
|---|---|---|---|---|---|
| 1 | 0.594 | 0.444 | 11.7 | 100 | 60 |
| 2 | 0.594 | 0.444 | 15.5 | 79 | 47 |
| 3 | 0.535 | 0.460 | 15.7 | 91 | 25 |
| 4 | 0.535 | 0.400 | 6.0 | 97 | 58 |
| 5 | 0.545 | 0.408 | 17.0 | 91 | 54 |

A blend of the polymer was made by agitating the polymer-solvent mixtures in a blend tank. The major portion of the polymer was coagulated by steam stripping out of the solvent and the wet polymer was extrusion dried using an extruder oil temperature of 300° F. except for the extrusion section which was water cooled.

The polymer blend had the following properties:

| | |
|---|---|
| Mooney value at 212° F. (ML–4) | 40 |
| Ash, percent | 0.22 |
| Inherent viscosity | 2.34 |
| Gel, percent | 0 |
| Infrared analysis: | |
| Cis, percent | 94.5 |
| Trans, percent | 2.2 |
| Vinyl, percent | 3.3 |

The cis, trans and vinyl content of the polymer was determined by infrared absorption spectral analysis. Polymer samples prepared for infrared analysis contained no antioxidant. They were dissolved in carbon disulfide to form a solution containing 2.5 weight percent of the polymer. If the polymer, as prepared, contained antioxidant, it was removed by reprecipitating the polymer twice from cyclohexane prior to preparing the carbon disulfide solution.

The infrared analysis procedure involved treating the polymer as a three-component mixture of cis-1,4, trans-1,4, and vinyl unsaturation, with each of these components having a major absorption band and exhibiting very weak absorbance in the region of maximum absorbance for the other two components. The maximum absorption band used for trans-1,4 unsaturation was 10.3 microns, and the maximum absorption band used for determining vinyl unsaturation was 11.0 microns. The infrared spectra were taken on a Perkin-Elmer Model 21 spectrophotometer equipped with a sodium chloride prism. Compensation for the carbon disulfide solvent was obtained by placing a cell of appropriate thickness filled with carbon disulfide in the reference beam. It was found that the cis-1,4 unsaturation gave an unsymmetrical band whose absorption maximum varied from 13.5 microns to 13.8 microns, depending upon the concentration of cis-1,4 unsaturation present.

The absorbance values for trans-1,4 and vinyl unsaturation were determined at the 10.3 and 11.0 micron bands as described in the usual manner by determining log $(I_0/I)$. Since the band due to cis-1,4 unsaturation varied, the absorbance due to this component was determined by measuring $$\log \frac{\int I_0 d\lambda}{\int I d\lambda}$$

where $I_0$ and $I$ are the intensities of the incident and transmitted radiation, respectively, at wave length $\lambda$. Actually, this ratio of integrals is the same as the log of the ratio of total area to the area of the unabsorbed portion in a given region of wave lengths. The limits used on the integrals were 12 and 15.75 microns.

After the absorbance due to each component was determined, the absorptivity for each component was calculated. The absorptivity $a$ is equal to $A/bc$ where $A$ is absorbance, $b$ is path length, and $c$ is concentration. Since these samples were three-component mixtures, it was necessary to calibrate the instrument using a high cis-1,4 content polymer, a high trans-1,4 content polymer and high vinyl content polymer. In addition to determining the absorptivities of each of the components at its maximum absorption band, the absorptivities of the other two components at this wave length were also determined. Using the determined absorptivities, the concentration of each component present was calculated by setting up three simultaneous equations, each of which contained terms for absorption due to cis, trans, and vinyl at 10.3, 11.0, and 12.0–15.75 microns, and solving the three equations in three unknowns simultaneously. By operating in this manner, the absorption at a given wave length due to the major component could be calculated and corrected for the amount of absorption at that wave length due to the other two components. It was thus found that the molar absorptivity at 10.3 microns due to trans-1,4 unsaturation was 133 liters-moles$^{-1}$-centimeters$^{-1}$, the molar absorptivity at 11.0 microns due to vinyl unsaturation was 184 liters-moles$^{-1}$-centimeters$^{-1}$, and the molar absorptivity in the 12.0–15.75 micron region due to cis-1,4-addition was 10.1 liters-moles$^{-1}$-centimeters$^{-1}$.

Inherent viscosity was determined as follows: One tenth gram of polymer was placed in a wire cage made from 80 mesh screen and the cage was placed in 100 ml. of toluene contained in a wide-mouth 4-ounce bottle. After standing at room temperature (approximately 25° C.) for 24 hours, the cage was removed and the solution was filtered through a C porosity sulfur absorption tube to remove any solid particles present. The resulting solution was run through a Medalia viscometer in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

The cis-polybutadiene, prepared as hereinbefore described, was compounded in four different recipes, using 65 phr. carbon black (Philblack 0, high abrasion furnace black) and 10 or 15 phr. plasticizer which was medium pine tar and/or oil (Philrich 5, highly aromatic oil). The Philrich (a trademark) 5 is a highly aromatic rubber extender and process oil having the following typical properties: an API gravity at 60° F. of 11.6, a flash point by COC at 480° F., a viscosity SUV at 210° F. of 175 and an aniline point of 110° F. For comparative purposes a butadiene/styrene rubber (GR–S) was compounded using a standard tread recipe. This rubber was prepared by emulsion polymerization at 41° F., contained 24 weight percent bound styrene, and had a Mooney value at 212° F. of about 52. The compounding recipes were as follows:

| Parts by weight | 1 | 2 | 3 | 4 | 5 |
|---|---|---|---|---|---|
| Cis-polybutadiene | 100 | 100 | 100 | 100 | |
| Butadiene/styrene rubber | | | | | 100 |
| Philblack 0 | 65 | 65 | 65 | 65 | 50 |
| Zinc oxide | 5 | 5 | 5 | 5 | 3 |
| Stearic acid | 0.2 | 0.2 | 0.2 | 0.2 | 1 |
| Flexamine [1] | 1.0 | 1.0 | 1.0 | 1.0 | 1 |
| Resin 731 D [2] | 5.0 | 5.0 | 5.0 | 5.0 | |
| Philrich 5 | 10.0 | | 5.0 | 15.0 | 10 |
| Pine tar | | 10.0 | 10.0 | | |
| Sulfur | 1.75 | 1.75 | 1.75 | 1.75 | 1.75 |
| NOBS Special [3] | 0.85 | 1.0 | 1.2 | 0.95 | |
| Santocure [4] | | | | | 1.2 |

[1] Physical mixture containing 65 percent of a complex diarylamine-ketone reaction product and 35 percent of N,N′-diphenyl-p-phenylenediamine.
[2] Disproportionated rosin acid.
[3] N-oxydiethylene-2-benzothiazylsulfenamide.
[4] N-cyclohexyl-2-benzothiazylsulfenamide.

Resin 731D is not included in the GR–S recipe. In polymerization this polymer is emulsified at least in part with a rosin soap which is converted to rosin acid on coagulation. A portion of the rosin acid is retained in the GR–S. No rosin soap or rosin acid is used in the polymerization of cis-polybutadiene.

The stocks were compounded in a "B" Banbury in the following cycles:

Cycle A—Cis-polybutadiene: 158° F. water through jacket; none through rotors

0′—Rubber+Flexamine
    ½′—Oil at 210° F.
    1½′—½ black+chemicals except curatives
    2½′—Remaining black+chemicals except curatives
    6′—Dump; sheet off on 158° F. mill Cycle B—Butadiene/styrene: cold water through jacket and rotors 0′—Rubber+Flexamine
    ½′—½ black+chemicals except curatives
    1½′—Remaining black+chemicals except curatives
    2′—Philrich 5
    4½′—Dump; sheet off on 158° F. mill Cis-polybutadiene was given a first remill at 158° F. with curatives being added at the start of the remill. Final remill was on a cold mill. The butadiene/styrene rubber was given two remills on a cold mill. Curatives were added on the first remill. A 6 x 12 roll mill was used.

Processing properties are shown in the following table:

TABLE I

| Runs | 1 | 2 | 3 | 4 | 5 |
|---|---|---|---|---|---|
| Mill banding | Fair+ | Good | Good | Poor | V. good. |
| MS 1½ at 212° F | 57.5 | 55.5 | 51 | 50 | 33.5. |
| Extrusion at 250° F.: | | | | | |
|   In./min | 34.5 | 30.4 | 34.5 | 34.0 | 46.5. |
|   G./min | 71.5 | 60.5 | 68.0 | 70.0 | 111.0. |
|   Rating | 11 | 12 | 12 | 11 | 11+. |
| Extrusion shrinkage, percent | 46.0 | 42.8 | 43.4 | 46.4 | 54.0 |

Extrusion ratings are determined by a modification of the tubing test described by Garvey, Whitlock, and Freeze, Ind. Eng. Chem., 34, 1309 (1942). The compounded stock is extruded through a No. ½ Royle extruder with a Garvey die. As the stock is extruded, it is pulled straight out from the die so that the narrow edge is pulled out. A piece is cut from a representative part of the strip and graded on the following three points: (1) Edge (should be smooth and continuous); (2) surface (should be smooth); and (3) corners (should be sharp and smooth). The rating on each point is from 1 to 4 with the 4 being the best. The value reported as "Extrusion rating" is the sum of the points.

The stocks were cured 30 minutes at 307° F. and physical properties determined. Results were as follows:

TABLE II

| Runs | 1 | 2 | 3 | 4 | 5 |
|---|---|---|---|---|---|
| Crosslinking, $\nu \times 10^4$, moles/cc.[1] | 1.96 | 1.95 | 1.93 | 1.87 | 1.43 |
| Compression set, percent [2] | 21.2 | 17.2 | 15.0 | 20.2 | 19.2 |
| 300% modulus, p.s.i., 80° F.[3] | 1,480 | 1,340 | 1,250 | 1,475 | 1,600 |
| Tensile, p.s.i., 80° F.[3] | 2,600 | 2,600 | 2,500 | 2,680 | 3,530 |
| Elongation, percent, 80° F.[3] | 480 | 525 | 550 | 495 | 545 |
| 200° F., tensile, p.s.i.[3] | 1,780 | 1,770 | 1,570 | 1,650 | 1,725 |
| Δ T, ° F.[4] | 58.1 | 68.6 | 63.9 | 55.1 | 58.5 |
| Resilience, percent [5] | 66.8 | 64.2 | 66.5 | 70.2 | 60.5 |
| Shore A hardness [6] | 66.5 | 68 | 67.5 | 64 | 61.5 |

[1] Number of network chains per unit volume of rubber as determined from swelling measurements, described by Kraus in Rubber World, 135, No. 1, 67–73 (1956) and 135, No. 2, 254–260 (1956).
[2] Compression set—ASTM D-395-55, Method B, modified (0.325-inch spacers), two hours at 212° F. plus relaxation for one hour at 212° F.
[3] Tension tests—ASTM D-412-51T, Scott Tensile Machine, L-6. Tested at designated temperature.
[4] Δ T, ° F., heat build-up—ASTM D-623-52T, Goodrich Flexometer, 143 lb./sq. inch load, 0.175 inch stroke. ΔT equals rise in temperature above 100° F. oven in 15 minutes.
[5] Resilience—ASTM D-945-55, modified, Yerzley Oscillograph. Test specimen, right circular cylinder 0.70 inch diameter and 1.0 inch height.
[6] Shore A hardness—ASTM D-676-55T, Shore Durometer, Type A.

The above data show the improved results which can be obtained in mill handling when pine tar is used to plasticize cis-polybutadiene. It is noted that mill handling characteristics of runs 2 and 3 which contain the pine tar compare very favorably with the milling characteristics of the butadiene-styrene stocks. The mill handling of run 1 was also acceptable even though pine tar was not used in the recipe and the reason for this, as will be shown by the examples to follow, is the low fatty acid content. The results of run 4 are anomalous since based on other data obtained, poor milling characteristics for this run would not be typical. However, the results can be evaluated as showing the superiority of the stocks containing pine tar or a mixture of pine tar and aromatic oil over stocks containing the aromatic oil plasticizer alone. The physical properties of all runs indicate acceptable tread stocks. It is further noted that all stocks extruded well, especially those containing the pine tar plasticizer.

*Example II*

A 38 Mooney (ML-4 at 212° F.) polybutadiene containing 94.5 percent cis, 2.2 percent trans, and 3.3 percent vinyl, and having 0.22 weight percent ash and zero gel (2.12 weight percent phenyl-beta-naphthylamine present) was compounded in accordance with the following recipes (curatives omitted):

|  | Parts by weight | |
| --- | --- | --- |
|  | A (Control) | B |
| Polybutadiene | 100 | 100 |
| Philblack O [1] | 65 | 65 |
| Zinc oxide | 3 | 3 |
| Stearic acid | 2 |  |
| Flexamine [1] | 1 | 1 |
| Philrich 5 [1] | 10 | 10 |
| Resin 731 D [1] | 5 | 5 |

[1] As in Example I.

The stocks were mixed in a Midget Banbury at 250° F. and 45 r.p.m. in an 8-minute cycle. All of the ingredients were added initially. The compounded stocks were then placed on the mill and later extruded. The following observations were made on the compounded stocks:

TABLE III

|  | A (Control) | B |
| --- | --- | --- |
| Sheeted off stock: |  |  |
| Width, inches | 4.65 | 4.65. |
| Appearance | Continuous | Very slightly lacy. |
| Edges | Slightly ragged | Ragged. |
| Surface | Slightly glossy | Slightly glossy. |
| MS-1 ½ at 212° F | 49.0 | 55.0. |
| Extrusion at 250° F.: |  |  |
| Inches/minute | 35.6 | 21.1. |
| Grams/minute | 79.0 | 43.5. |
| Grams/inch | 2.22 | 2.06. |
| Cubic centimeters/inch | 1.95 | 1.81. |
| Rating | 11+ | 11+. |
| Mill banding: |  |  |
| At 125° F | Poor | Banded on mill. |
| At 200° F | Baggy | Do. |
| At 250° F | do | Do. |

The following curatives were added on the mill to each of the above compounded stocks:

|  | Parts by weight | |
| --- | --- | --- |
|  | A (Control) | B |
| Sulfur | 1.75 | 1.75 |
| NOBS Special [1] | 0.85 | 0.85 |

[1] N-oxydiethylene-2-benzothiazyl sulfenamide.

The stock were cured 30 minutes at 307° F. and physical properties determined. Results were as follows:

TABLE IV

|  | A (Control) | B |
| --- | --- | --- |
| Crosslinking, $\nu \times 10^4$, moles/cc | 1.81 | 1.89 |
| Compression set, percent | 27.1 | 24.1 |
| 300% modulus, p.s.i. 80° F | 1,475 | 1,435 |
| Tensile, p.s.i., 80° F | 2,800 | 2,800 |
| Elongation, percent, 80° F | 500 | 470 |
| Shore hardness | 61 | 62 |
| $\Delta T$, ° F | 52.7 | 57.1 |
| Resilience, percent | 67.6 | 68.0 |

As can be seen from the above data, omission of stearic acid from the compounding recipe enables marked improvement in the mill handling characteristics of the cis-polybutadiene stock over a wide range of temperatures. The stock containing conventional loading of 2 phr. stearic acid did not band well on the mill and the milling was unacceptable. The data of Table IV further show that the physical properties of the run from which stearic acid was omitted were not adversely affected except for slightly poorer hysteresis.

*Example III*

The polybutadiene described in Example II was compounded in accordance with the following formulations:

|  | Parts by weight | |
| --- | --- | --- |
|  | A (Control) | B |
| Polybutadiene | 100 | 100 |
| Philblack O [1] | 65 | 65 |
| Zinc oxide | 5 | 5 |
| Flexamine [1] | 1 | 1 |
| Stearic acid | 1 |  |
| Resin 731 D [1] | 5 | 5 |
| Pine tar | 10 | 10 |

[1] As in Example I.

The following observations were made on the compounded stocks which were mixed as described in Example II:

TABLE V

|  | A (Control) | B |
| --- | --- | --- |
| MS-1 ½ at 212° F | 58.5 | 61. |
| Extrusion at 250° F.: |  |  |
| Inches/minute | 34.5 | 27.0. |
| Grams/minute | 69.0 | 53.5. |
| Grams/inch | 2.00 | 1.98. |
| Rating | 12– | 12–. |
| Milling characteristics, 200° F.: |  |  |
| Banding | Poor | Good. |
| Appearance of sheeted off stock | Continuous; edges slightly ragged | Continuous; edges ragged. |
| Milling characteristics, 260° F.: |  |  |
| Banding | Poor | Good. |
| Appearance of sheeted off stock | Continuous; edges slightly ragged | Continuous; edges slightly ragged. |

The following curatives were added on the mill to each of the above compounded stocks:

|  | Parts by weight | |
| --- | --- | --- |
|  | A (Control) | B |
| Sulfur | 1.75 | 1.75 |
| NOBS Special [1] | 1.0 | 1.0 |

[1] As in Example I.

The stocks were cured 30 minutes at 307° F. and physical properties determined. Results were as follows:

TABLE VI

|  | A (Control) | B |
| --- | --- | --- |
| Crosslinking, $\nu \times 10^4$, moles/cc | 1.69 | 1.75 |
| Compression set, percent | 21.4 | 20.0 |
| 300% modulus, p.s.i. 80° F | 1,250 | 1,290 |
| Tensile, p.s.i., 80° F | 2,425 | 2,750 |
| Elongation, percent, 80° F | 535 | 580 |
| $\Delta T$, ° F | 68.9 | 68.9 |
| Resilience, percent | 62.6 | 64.0 |
| Shore hardness | 65 | 65 |

The above data show that a stearic acid loading as low as 1 phr. provides a stock which cannot be milled adequately even though pine tar is employed in the recipe. Again, as in Example II, the stocks from which stearic acid was omitted were readily milled on the roll mill.

Example IV

A 38 Mooney (ML-4 at 212° F.) cis-polybutadiene of 94.6 percent cis, 2.4 percent trans, and 3.0 percent vinyl content, prepared at 20° F. and containing 1.44 weight percent phenyl-beta-naphthylamine, was compounded in the following recipes:

|  | 1 | 2 | 3 | 4 | 5 | 6 | 7 |
|---|---|---|---|---|---|---|---|
| Cis-polybutadiene | 100 | 100 | 100 | 100 | 100 | 100 | 100 |
| Philblack, O [1] | 65 | 65 | 65 | 65 | 65 | 65 | 65 |
| Zinc oxide | 5 | 5 | 5 | 5 | 5 | 5 | 5 |
| Stearic acid | 0.4 | 0.6 | 0.8 | 0.4 | 0.4 | 0.6 | 0.4 |
| Flexamine [1] | 1.0 | 1.0 | 1.0 | 1.0 | 1.0 | 1.0 | 1.0 |
| Resin 731 D [1] | 5 | 5 | 5 | 5 | 5 | 5 | 5 |
| Philrich 5 [1] | 5 | 5 | 5 |  |  |  |  |
| Pine tar (PT-600) [1] | 10 | 10 | 10 | 15 |  |  |  |
| Butarez 15 [2] |  |  |  |  | 10 | 10 | 15 |
| Sulfur | 1.75 | 1.75 | 1.75 | 1.75 | 1.75 | 1.75 | 1.75 |
| NOBS Special [1] | 1.1 | 1.1 | 1.1 | 1.1 | 0.9 | 0.9 | 1.0 |

[1] As in Example I.
[2] Sp. gr. at 60° F., 0.9083; refractive index, $n$ 20/D, 1.5198; Gardner color, 11; volatile material, 1.0 wt. percent; viscosity, SFV at 100° F., 1500. Liquid polybutadiene.

The stocks were compounded in a "B" Banbury at 158° F. (temperature of water through Banbury) in a 6-minute cycle. Curatives were added on a 158° F. mill on first remill. A final remill was effected at 125° F. Processing properties of the stocks and physical properties of the stocks which were cured 30 minutes at 307° F. are shown in the following table:

TABLE VII.—STOCKS FROM RECIPES

[Processing Properties]

|  | 1 | 2 | 3 | 4 | 5 | 6 | 7 |
|---|---|---|---|---|---|---|---|
| Milling | Good | Good | Good | Good | Fair | Fair | Fair+ |
| MS-1 ½ at 212° F | 45.5 | 45.5 | 44.5 | 48.4 | 52.5 | 51.5 | 45.5 |
| Extrusion at 250° F.—Garvey Die: |  |  |  |  |  |  |  |
| In./min | 38.3 | 39.8 | 43.5 | 38.0 | 36.4 | 39.5 | 43.5 |
| G./min | 76.5 | 79.5 | 86.0 | 74.5 | 76.3 | 83.3 | 89.0 |
| Rating | 12− | 12− | 12− | 12− | 10− | 10 | 9− |

Physical Properties (Cured 30 Minutes at 307° F.)

|  | 1 | 2 | 3 | 4 | 5 | 6 | 7 |
|---|---|---|---|---|---|---|---|
| $\nu \times 10^4$, moles/cc | 1.52 | 1.53 | 1.48 | 1.40 | 1.64 | 1.67 | 1.57 |
| Compression set, percent | 19.0 | 18.7 | 19.6 | 21.0 | 21.0 | 20.6 | 19.7 |
| 300% modulus, p.s.i., 80° F | 1,000 | 1,040 | 1,010 | 950 | 1,310 | 1,410 | 1,280 |
| Tensile, p.s.i., 80° F | 2,490 | 2,625 | 2,560 | 2,460 | 2,425 | 2,375 | 2,425 |
| Elongation, percent, 80° F | 605 | 655 | 655 | 680 | 465 | 450 | 480 |
| $\Delta T$, ° F | 67.9 | 68.6 | 68.9 | 77.1 | 63.2 | 61.2 | 60.5 |
| Resilience, percent | 63.5 | 63.7 | 62.9 | 58.5 | 67.2 | 67.5 | 67.6 |
| Shore hardness | 67.5 | 66 | 65.5 | 67.5 | 66 | 66.5 | 65.5 |

The above data show that varying amounts of stearic acid up to 0.8 phr. can be employed in cis-polybutadiene recipes with satisfactory results. Superior mill handling is obtained when pine tar is employed either alone or in admixture with another liquid plasticizer. A mixture of pine tar and aromatic oil plasticizer gives the advantages of good milling with lower heat build-up than when pine tar is used alone. As shown by runs 5 to 7, a low loading of stearic acid enabled acceptable milling characteristics when using liquid polybutadiene as a plasticizer.

Example V

A 41 Mooney (ML-4 at 212° F.) cis-polybutadiene of 94.2 percent cis, 2.5 percent trans, and 3.3 percent vinyl content, prepared at 20° F., and containing 1.59 weight percent phenyl-beta-naphthylamine was compounded in accordance with the following formulations:

|  | 1 | 2 | 3 | 4 | 5 | 6 |
|---|---|---|---|---|---|---|
| Cis-polybutadiene | 100 | 100 | 100 | 100 | 100 | 100 |
| Philblack, O [1] | 65 | 65 | 62.5 | 62.5 | 60 | 60 |
| Zinc oxide | 5 | 5 | 5 | 5 | 5 | 5 |
| Stearic acid | 0.5 | 0.5 | 0.5 | 0.5 | 0.5 | 0.5 |
| Flexamine [1] | 1 | 1 | 1 | 1 | 1 | 1 |
| Resin 731 D [1] | 5 | 5 | 5 | 5 | 5 | 5 |
| Philrich 5 [1] | 5 | 5 | 5 | 5 | 10 | 5 |
| Pine tar (PT-600) [1] | 10 | 5 | 10 | 5 | 10 | 5 |
| Sulfur | 1.75 | 1.75 | 1.75 | 1.75 | 1.75 | 1.75 |
| NOBS Special [1] | 1.15 | 0.9 | 1.15 | 0.9 | 1.15 | 0.9 |

[1] As in Example I.

The stocks were mixed in a "B" Banbury using the same mixing cycle and temperature given in the preceding study. Sulfur and accelerator were added in a Banbury remill at 158° F. (water temperature) and a final remill on the roll mill was made at 125° F. Processing properties of the stocks and physical properties of the stocks which were cured 30 minutes at 307° F. and are shown in the following table:

TABLE VIII.—STOCKS FROM RECIPES

[Processing Properties]

|  | 1 | 2 | 3 | 4 | 5 | 6 |
|---|---|---|---|---|---|---|
| Milling | Fair+ | Fair | Fair+ | Fair | Fair+ | Fair− |
| MS-1 ½ at 212° F | 49.5 | 56 | 47.5 | 51.5 | 44.5 | 50.0 |
| Extrusion at 250° F.—Garvey Die: |  |  |  |  |  |  |
| In./min | 38.3 | 36.3 | 37.8 | 35.0 | 38.1 | 35.8 |
| G./min | 76.3 | 74.5 | 76.5 | 73.0 | 80.0 | 76.0 |
| Rating | 12 | 12− | 12 | 12 | 11+ | 10+ |

[Physical Properties]

|  | 1 | 2 | 3 | 4 | 5 | 6 |
|---|---|---|---|---|---|---|
| $\nu \times 10^4$, moles/cc | 1.63 | 1.66 | 1.59 | 1.60 | 1.63 | 1.62 |
| Compression set, percent | 18.5 | 21.1 | 20.2 | 23.0 | 19.8 | 24.3 |
| 300% Modulus, p.s.i., 80° F | 1,130 | 1,270 | 1,030 | 1,050 | 960 | 1,100 |
| Tensile, p.s.i., 80° F | 2,340 | 2,430 | 2,420 | 2,560 | 2,500 | 2,560 |
| Elongation, percent, 80° F | 550 | 520 | 605 | 590 | 620 | 590 |
| $\Delta T$, ° F | 68.3 | 69.3 | 65.5 | 66.6 | 62.8 | 62.5 |
| Resilience, percent | 61.5 | 62.9 | 62.4 | 63.7 | 63.9 | 65.6 |
| Shore hardness | 65.5 | 65.5 | 64 | 64.5 | 62.5 | 62.5 |

The runs of this example containing variable amounts of black show that good results in mill handling can be obtained when plasticizing with a mixture of pine tar and aromatic oil and a stearic acid loading of 0.5. It can be appreciated, therefore, that our invention provides a solution to the mill handling problem of cis-polybutadiene, by limiting the fatty acid content thereof and further by plasticizing with pine tar alone or pine tar and hydrocarbon oil.

As will be evident to those skilled in the art, various modifications of this invention can be made, or followed, in the light of the foregoing disclosure and discussion, without departing from the spirit or scope thereof.

We claim:

1. A method of improving the milling characteristics of cis-polybutadiene containing at least 75 percent cis-1,4 configuration and having a Mooney value (ML-4) of at least 25 which comprises compounding 100 parts by weight of said cis-polybutadiene with 60 to 100 parts by weight of said carbon black from 10 to 50 parts by weight of liquid plasticizer for rubber of which, from 5 to 15 parts by weight are pine tar, and 0 to 0.8 part by weight of stearic acid, and thereafter milling the thus compounded stock on a roll mill.

2. A method of improving the milling characteristics of cis-polybutadiene containing at least 75 percent cis-1,4 configuration and having a Mooney value (ML-4) of at least 25 which comprises compounding 100 parts by weight of said cis-polybutadiene with about 60 to 200 parts by weight of carbon black, about 5 to 130 parts by weight of plasticizer for rubber of which at least 5 parts are pine tar and from 0.2 to 0.8 parts by weight of stearic acid, and thereafter milling the thus compounded stock on a roll mill.

3. A rubbery composition which in its uncured state exhibits improved mill handling characteristics comprising 100 parts by weight of cis-polybutadiene having at least 75 percent cis-1,4 configuration and a Mooney value (ML-4) of at least 25, about 60 to 200 parts by weight of carbon black, about 5 to 130 parts by weight of plasticizer for rubber of which at least 5 parts are pine tar plasticizer, and from 0 to 0.8 part by weight of stearic acid.

4. The composition of claim 3 which contains no fatty acid.

5. A rubbery composition which in its uncured state exhibits improved mill handling characteristics comprising 100 parts by weight of cis-polybutadiene having at least 75 percent cis-1,4 configuration and a Mooney value (ML-4) of at least 25, about 60 to 100 parts by weight of carbon black, about 10 to 50 parts by weight of liquid plasticizer for rubber of which at least 5 parts are pine tar, and from 0 to 0.5 part by weight of stearic acid.

6. The composition of claim 5 containing not over 15 parts of pine tar and from 5 to 45 parts of liquid plasticizer selected from the group consisting of highly aromatic oil and conjugated diene polymer.

7. The composition of claim 5 wherein the weight ratio of pine tar to stearic acid is at least 10:1.

8. A rubbery composition which in its uncured state exhibits improved mill handling characteristics comprising 100 parts by weight of cis-polybutadiene having at least 90 percent cis-1,4 configuration and a Mooney value (ML-4) in the range of 35 to 45, 60 to 75 parts by weight of carbon black, 0 to 0.5 part by weight of stearic acid, 5 to 15 parts by weight of pine tar, and about 5 to 15 parts by weight of highly aromatic oil plasticizer.

9. A rubbery composition which in its uncured state exhibits improved mill handling characteristics comprising 100 parts by weight of cis-polybutadiene having at least 75 percent cis-1,4 configuration and a Mooney value (ML-4) of at least 25, about 60 to 200 parts by weight of carbon black, about 5 to 135 parts by weight of plasticizer for rubber of which at least 5 parts are pine tar and from 0.2 to 0.8 part by weight of stearic acid.

References Cited by the Examiner

UNITED STATES PATENTS

| | | | |
|---|---|---|---|
| 2,628,952 | 2/1953 | Sanders et al. | 260—94.7 |
| 2,688,605 | 9/1954 | Tucker | 260—94.7 |
| 2,715,650 | 8/1955 | Doak | 260—23.7 |
| 2,721,185 | 10/1955 | Schulze et al. | 260—23.7 |
| 2,828,272 | 3/1958 | Ullrich | 260—23.7 |
| 2,870,105 | 1/1959 | Ridgeway et al. | 260—23.7 |
| 2,882,287 | 4/1959 | Rowlands et al. | 260—23.7 |

OTHER REFERENCES

Rubber World, 1957, vol. 138, pages 75 to 80 and 84.

The Rubber and Plastics Age, 1957, vol. 38, pages 880 and 881, June 1958, pages 502 to 504.

Grant, Hackh's Chemical dictionary, 3rd Edition, McGraw-Hill, New York, 1944, page 333 relied upon.

MURRAY TILLMAN, *Primary Examiner.*

ALLEN M. BOETTCHER, ALFONSO SULLIVAN, LEON J. BERCOVITZ, *Examiners.*